United States Patent
Wang

(10) Patent No.: US 8,870,150 B2
(45) Date of Patent: Oct. 28, 2014

(54) FRAME FOR POWER MACHINERY

(71) Applicant: Wen Chang Wang, Tainan (TW)

(72) Inventor: Wen Chang Wang, Tainan (TW)

( * ) Notice: Subject to any disclaimer, the term of this patent is extended or adjusted under 35 U.S.C. 154(b) by 25 days.

(21) Appl. No.: 13/845,284

(22) Filed: Mar. 18, 2013

(65) Prior Publication Data

US 2014/0263937 A1    Sep. 18, 2014

(51) Int. Cl.
F16M 11/00    (2006.01)
F16M 1/00     (2006.01)

(52) U.S. Cl.
CPC .................................. F16M 1/00 (2013.01)
USPC ....................... 248/672; 123/195 C

(58) Field of Classification Search
USPC ............. 123/195 R, 195 C, 195 E; 248/672; 290/1 A
See application file for complete search history.

(56) References Cited

U.S. PATENT DOCUMENTS

| | | | |
|---|---|---|---|
| 6,376,951 B1 * | 4/2002 | Moore | 310/89 |
| 6,784,560 B2 * | 8/2004 | Sugimoto et al. | 290/1 R |
| 7,089,889 B2 * | 8/2006 | Johnson et al. | 123/2 |
| 7,482,706 B2 * | 1/2009 | Uchimi et al. | 290/1 A |
| 7,642,665 B2 * | 1/2010 | Konop et al. | 290/1 A |
| 8,616,159 B1 * | 12/2013 | Hawkins | 123/2 |
| 2007/0108767 A1 * | 5/2007 | Hirose et al. | 290/1 A |
| 2007/0193536 A1 * | 8/2007 | Johnson et al. | 123/2 |
| 2007/0205350 A1 * | 9/2007 | Shimada et al. | 248/652 |
| 2011/0006505 A1 * | 1/2011 | Wang | 280/651 |
| 2013/0050975 A1 * | 2/2013 | Carpenter | 361/807 |
| 2013/0074421 A1 * | 3/2013 | Wood et al. | 52/3 |

* cited by examiner

Primary Examiner — Bradley Duckworth
(74) Attorney, Agent, or Firm — Alan Kamrath; KAMRATH IP Lawfirm, P.A.

(57) ABSTRACT

A frame for a power machinery, such as a pump, a motor, a generator, etc., includes a machine frame formed by connecting a plurality of tubes; two roofs installed at upper ends of the tubes and having a plurality of latch bases disposed on inner sides of the two roofs respectively; and a plurality of side plates installed on outer sides of the two roofs and having a plurality of elastic latch rods installed on inner ends of the plurality of side plates, and a tube clamp adjacent the inner end of each side plate. The elastic latch rod is latched to the latch base, and the tube clamps are latched to the tubes, so that the two roofs and the plurality of side plates are fixed at a top end of the machine frame to form a rain shelter.

4 Claims, 5 Drawing Sheets

FRAME FOR POWER MACHINERY

BACKGROUND OF THE INVENTION

1. Field of the Invention

The present invention relates to a frame for power machinery, such as a pump, a motor and a generator and more particularly, to the frame with sun-shading and rain-shading functions and an easy-to-carry or easy-to-transport feature, with the frame fitting the power machineries of different sizes or specifications.

2. Description of the Related Art

Power machinery generally refers to a generator, machine tool, agricultural machinery, or construction machinery having a pump or a motor.

When the power machinery is installed outdoors, a shelter is generally mounted onto the top of a machine frame for the purpose of shading sun and rain. However, such arrangement not only hinders the undertaking of construction work, but also causes inconvenient carriage and transportation. Obviously, improvements are required.

SUMMARY OF THE INVENTION

Therefore, it is a primary objective of the present invention to provide a frame for power machinery capable of shading sun and rain as well as providing an easy way of carrying or transporting a pump, a motor, a generator, etc.

Another objective of the present invention is to provide a frame for power machinery that can fit pumps, motors or generators of different sizes or specifications.

To achieve the aforementioned objective, the present invention comprises: a machine frame formed by connecting a plurality of tubes; two roofs installed at upper ends of the tubes and having a plurality of latch bases disposed on inner sides of the two roofs respectively; and a plurality of side plates installed on outer sides of the two roofs and having a plurality of elastic latch rods installed on inner ends of the plurality of side plates, and a tube clamp adjacent each inner end of the plurality of side plates. The elastic latch rod is latched to the latch base, and the tube clamps are latched to the plurality of tubes, so that the two roofs and the plurality of side plates are fixed at a top end of the machine frame to form a rain shelter.

DETAILED DESCRIPTION OF THE PREFERRED EMBODIMENTS

The objectives, technical characteristics, measures, effects and advantages of the present invention will become apparent with the detailed description of the preferred embodiments accompanied with the illustration of related drawings as follows.

Figure 1:
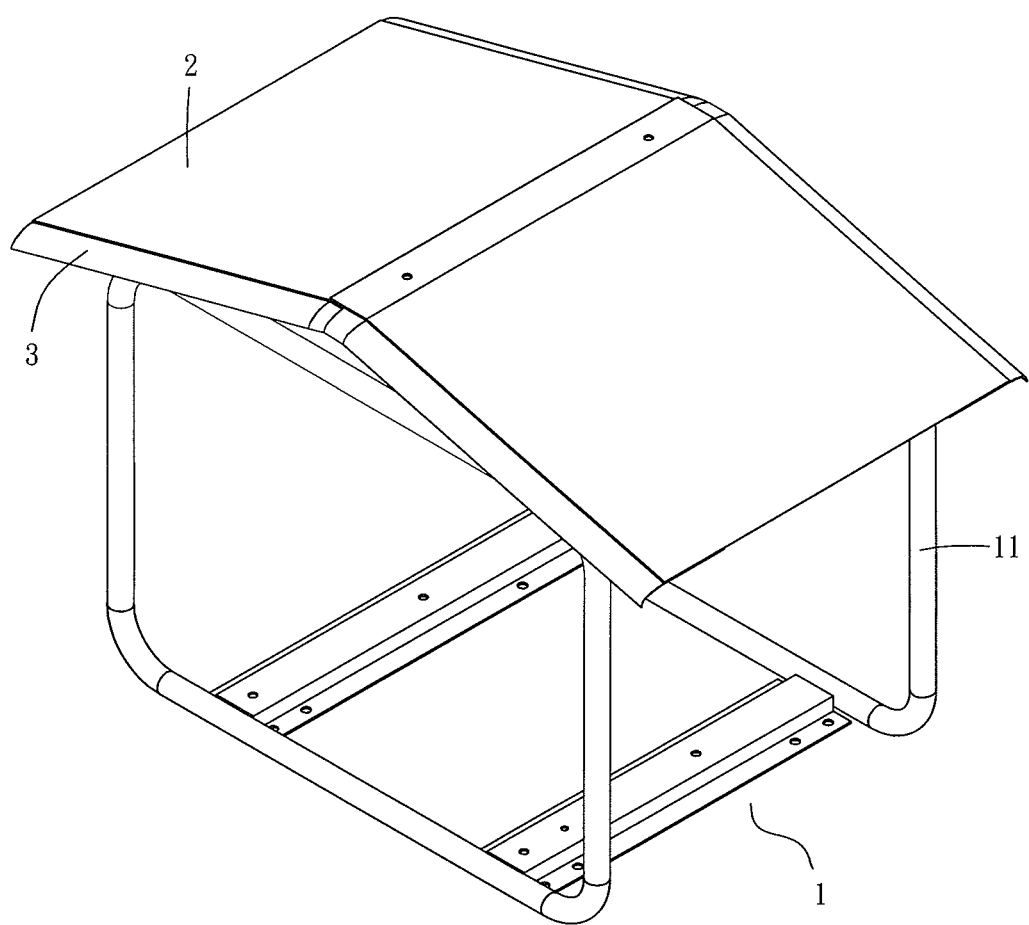
FIG. 1 is a perspective view of the present invention.
Figure 2:
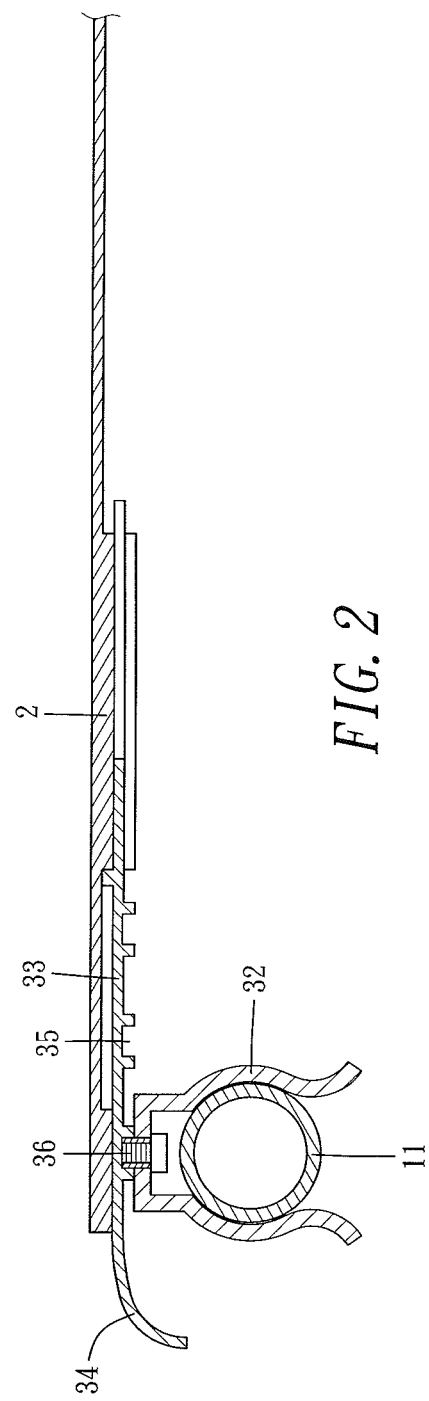
FIG. 2 is a side view of the present invention.
Figure 3:
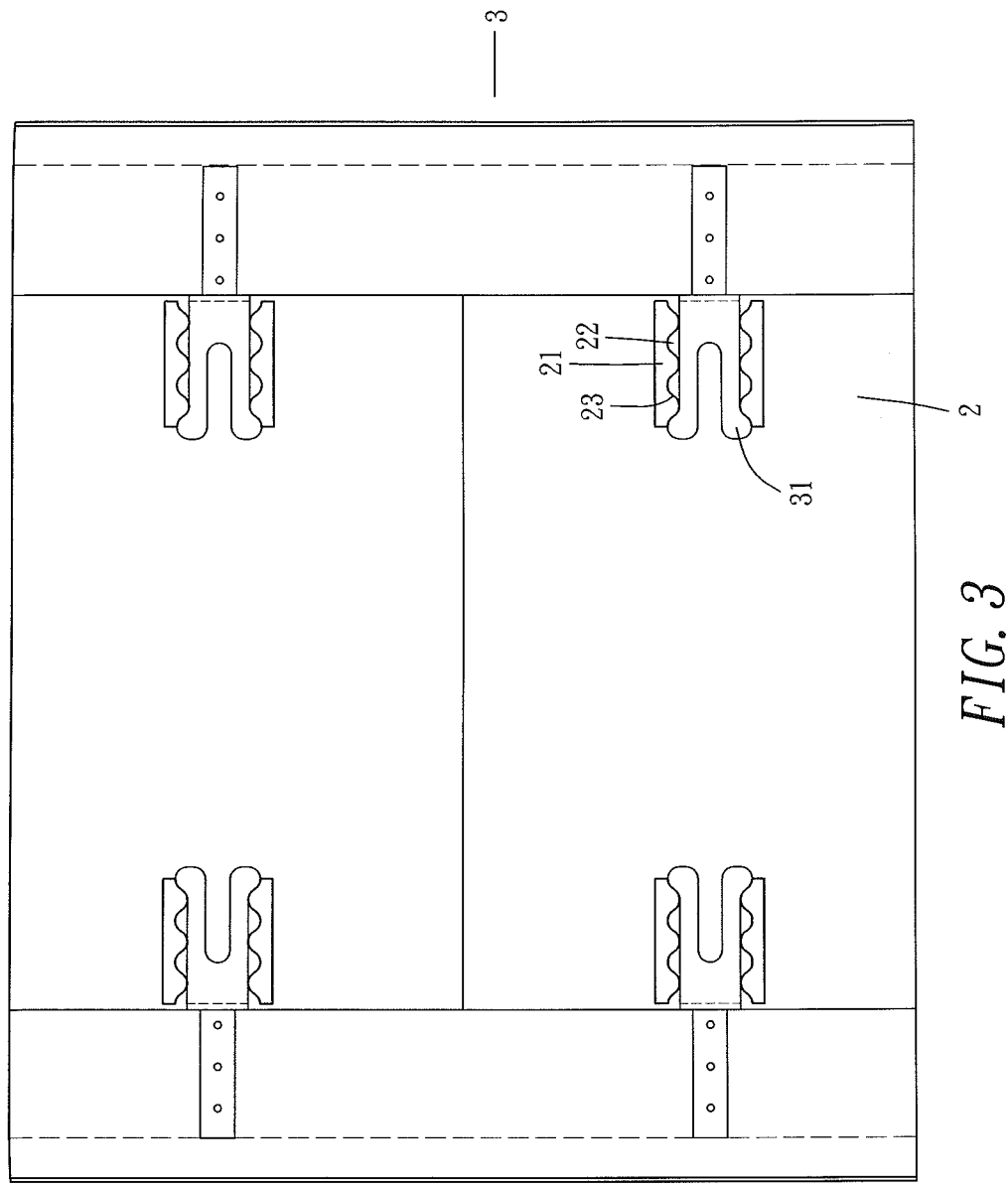
FIG. 3 is a cross-sectional view of a roof and a side plate of the present invention.

With reference to FIGS. 1 to 3, the present invention comprises a machine frame 1 formed by connecting a plurality of tubes 11. The top end of each tube 11 is progressively inclined from both sides towards the middle to define an inclined state. The roofs 2 are disposed across the top ends of the tubes 11 and have a plurality of latch bases 21 disposed on inner sides of the two roofs 2. Each latch base 21 has a through hole 22, and a plurality of latching teeth 23 disposed in the through hole 22. A plurality of side plates 3 is installed on external sides of the two roofs 2, and has a plurality of elastic latch rods 31 installed on the inner ends and tube clamps 32 installed adjacent the inner ends of the plurality of side plates 3. Each latch rod 31 is engaged with the respective latch base 21, and the tube clamps 32 are latched with the tubes 11, so that the plurality of side plates 3 and the two roofs 2 can be fixed at the top end of the machine frame 1. An extension 33 is disposed at an end of each side plate 3, and a downwardly indented arc recess 34 is formed at the other end of each side plate 3. The extension 33 has a greater length than the arc recess 34. Each side plate 3 has a plurality of screw holes 35 for fixing the tube clamp 32 by screws 36, so that the position can be adjusted or changed as needed. In the process of installing the aforementioned assembly, the latch rods 31 are latched with the latch bases 21 respectively, so that the two roofs 2 and the plurality of side plates 3 are combined with each other. The extension 33 of the side plate 3 is situated at the bottom of the roof 2, and the arc recess 34 is protruded from the external side of the roof 2. The tube clamp 32 are latched with the plurality of tubes 11 to fix the two roofs 2 and the plurality of side plates 3 to the top end of the machine frame 1 to form a rain shelter as shown in FIGS. 1 and 3.

In addition, the inner sides of the two roofs 2 are situated on a plane, so that the two roofs 2 can be overlapped or coupled with each other. The the screws 36 are used for fixing the two roofs to achieve the rain-shading effect as shown in FIG. 1.

Figure 4:
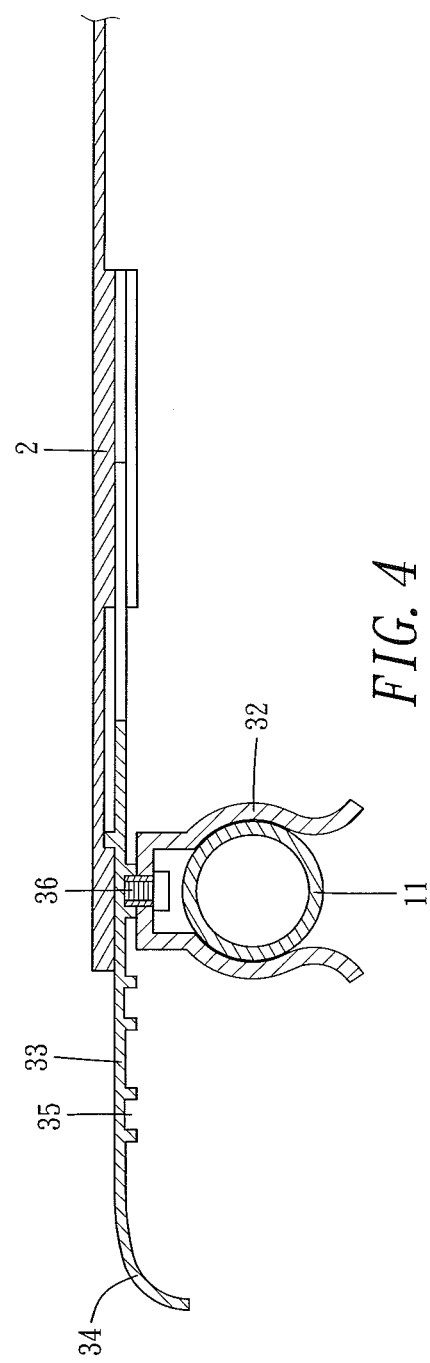
FIG. 4 is a side view of adjusting a side plate of the present invention.

In a larger machine frame 1, the interval between the two tubes 11 is greater. Therefor; a design capable of telescoping the latch rod 31 inside the through hole 22 of the latch base and latching and positioning the latch rod 31 with the latching teeth 23 is provided, and the extension 33 can be adjusted to extend the length as needed and secured to different screw holes 35. The position of the tube clamps 32 can be adjusted or changed to latch the plurality of tubes 11 as shown in FIG. 4, to achieve the effect of fitting a power machinery of different sizes or specifications.

Figure 5:
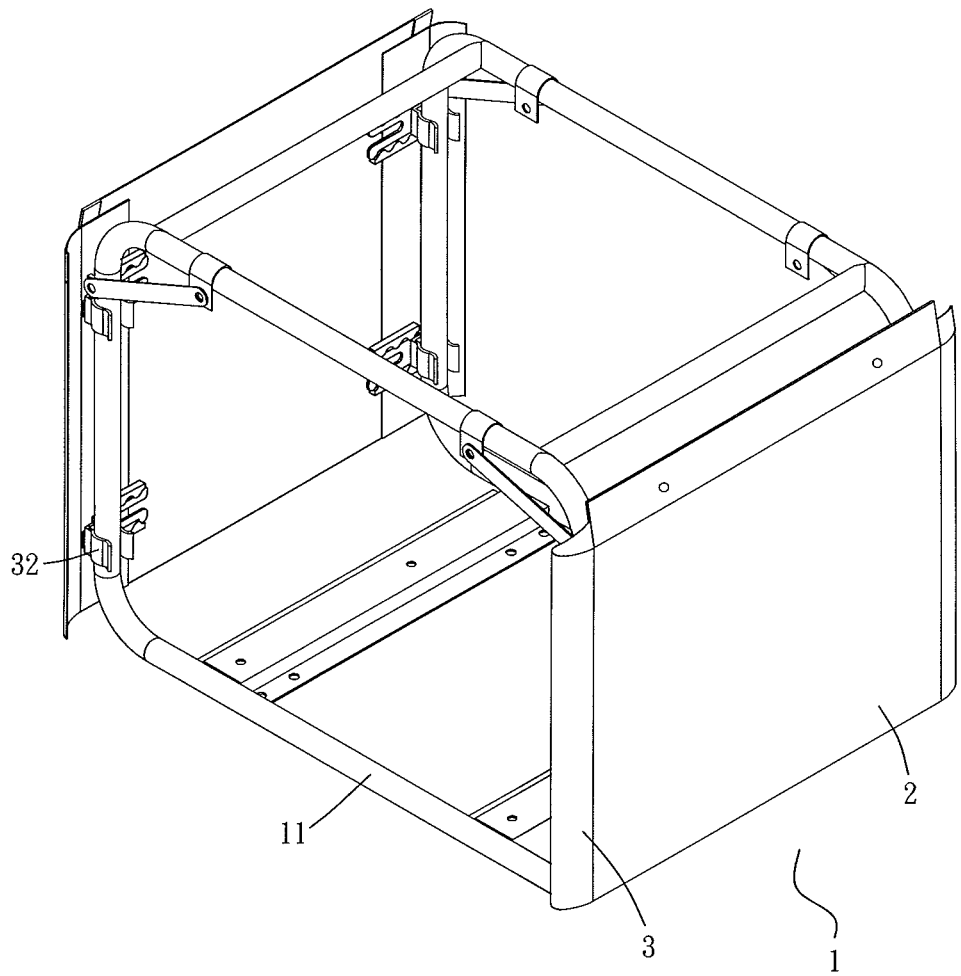
FIG. 5 is a perspective view of the present invention when not in use.

When the invention is not in use (or there is no need of shading rain temporarily), the two roofs 2 and the plurality of side plates 3 can be moved and hanged on both sides of the machine frame 1 as shown in FIG. 5 in order to avoid missing the two roofs 2 or the plurality of side plates 3 or causing inconvenience to carry or move the frame.

In summation of the description above, the present invention at least has the following advantages over the prior art.

1. The invention can provide rain-shading and sun-shading, and not only can increase the service life of the product, but can reduce the noise produced by engines, and also can avoid the risk of electric leakage, particularly in electric products.

2. The installation and removal of the rain shelter are simple, quick and convenient and can be achieved by latching or separating the tube clamps 32 and the tubes 11.

3. When the frame of the power machinery is not in use, the two roofs 2 and the plurality of side plates 3 can be hung on both sides of the machine frame 1 to avoid missing the two roofs 2 and/or the plurality of side plates 3 and facilitate carrying or moving the frame.

4. The invention can fit machine frames of different sizes or specifications.

While the invention has been described by means of specific embodiments, numerous modifications and variations could be made thereto by those skilled in the art without departing from the scope and spirit of the invention set forth in the claims.

In summation of the description above, the present invention can achieve the expected objectives and effects.

What is claimed is:

1. A frame for a power machinery having a pump, a motor, or a generator, comprising:
   a machine frame formed by connecting a plurality of tubes;
   two roofs installed at tops of the plurality of tubes, and having a plurality of latch bases disposed on inner sides of the two roofs;
   a plurality of side plates disposed on outer sides of the two roofs, and having a plurality of elastic latch rods installed on inner ends of the plurality of side plates and a tube clamp adjacent each inner end of the plurality of side plates, with the plurality of elastic latch rods latched to the plurality of latch bases, and with the tube clamps latched to the plurality of tubes, with the two roofs and the plurality of side plates fixed at a top end of the machine frame.

2. The frame of claim 1, wherein each latch base includes a through hole, and a plurality of latching teeth formed in the through hole.

3. The frame of claim 1, wherein each side plate includes an extension disposed at the inner end of the side plate, and an indented arc recess formed at another end of the side plate, with the extension having a greater length than the indented arc recess.

4. The frame of claim 1, wherein each side plate has a plurality of through holes for adjusting and changing the position of the tube clamp.

\* \* \* \* \*